Dec. 8, 1931.    H. C. SCHAPER    1,835,185
WEIGHING SCALE
Filed July 7, 1930    3 Sheets-Sheet 3
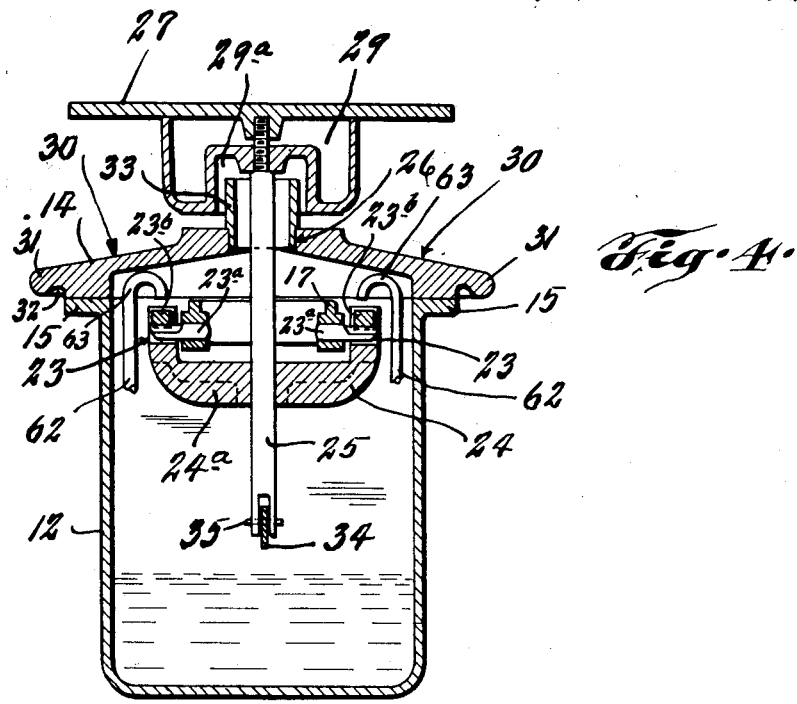
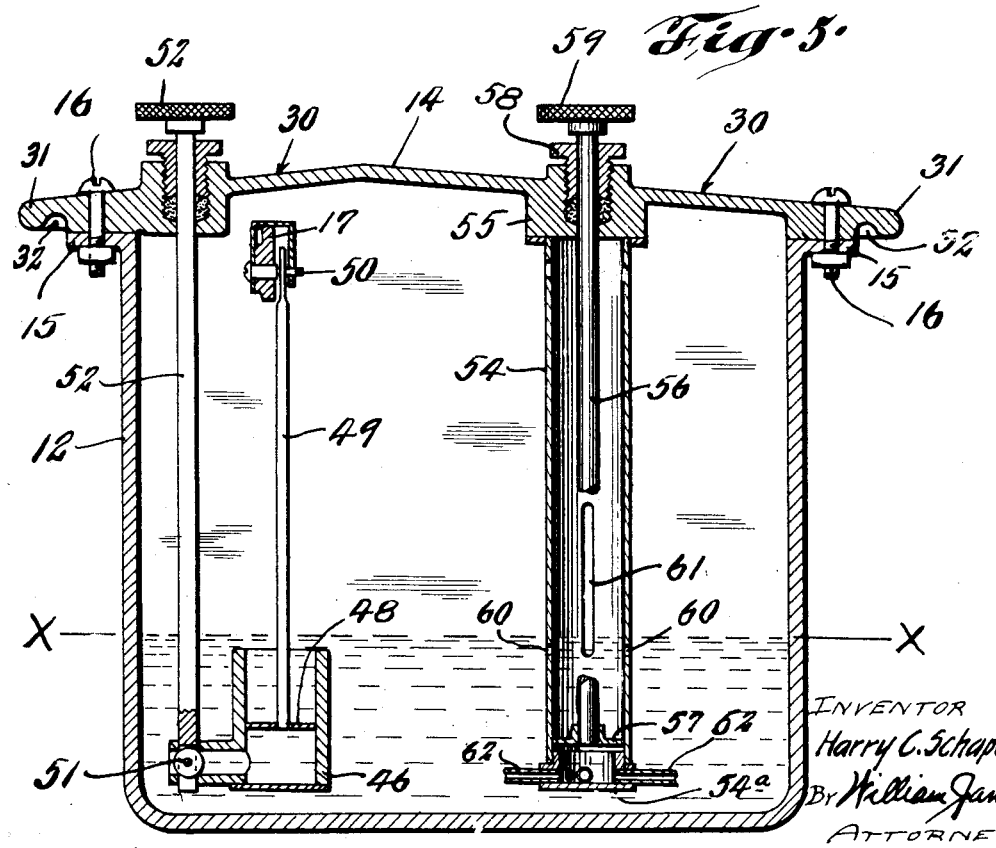

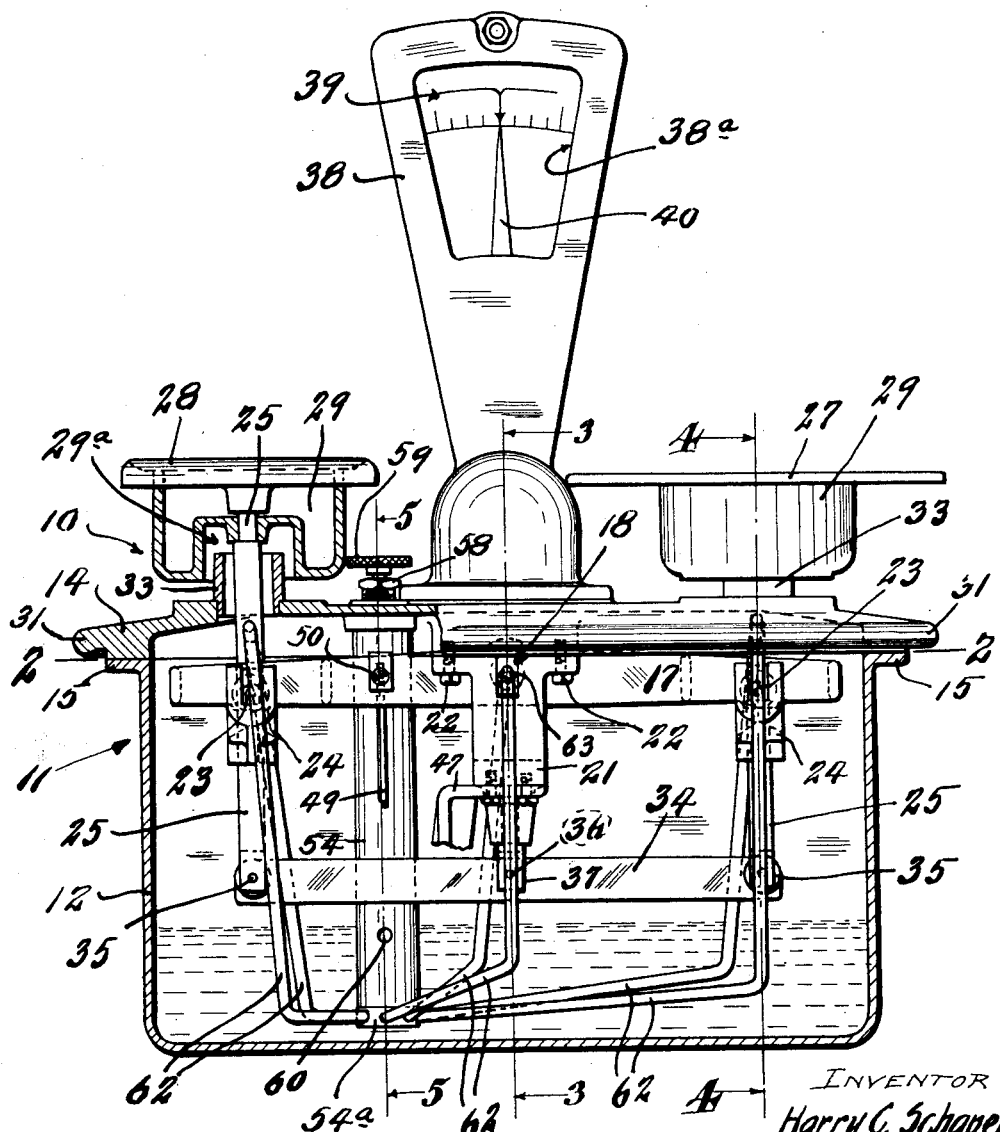

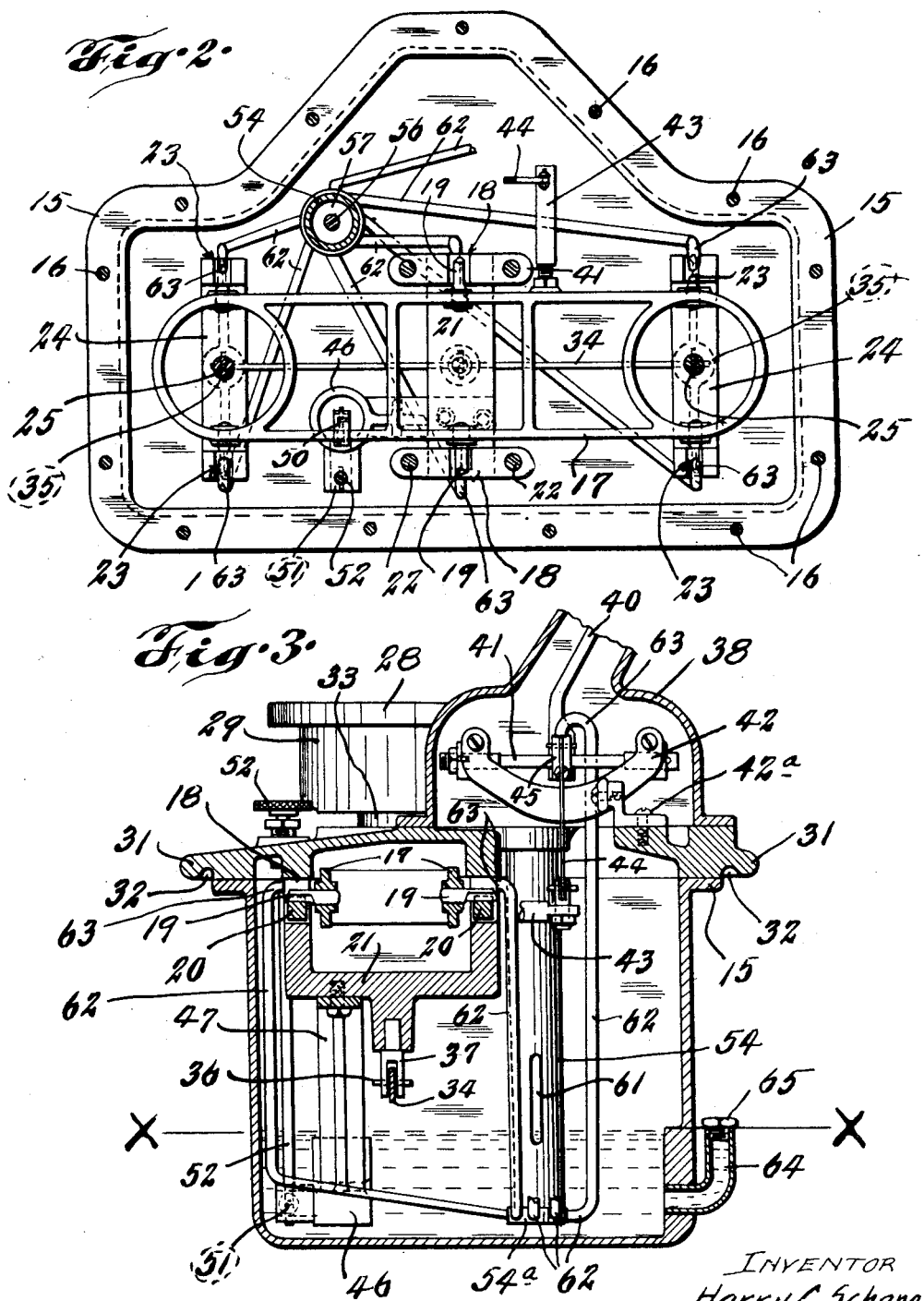

Patented Dec. 8, 1931

1,835,185

UNITED STATES PATENT OFFICE

HARRY C. SCHAPER, OF COLUMBUS, OHIO, ASSIGNOR TO THE EXACT WEIGHT SCALE COMPANY, OF COLUMBUS, OHIO, A CORPORATION OF OHIO

WEIGHING SCALE

Application filed July 7, 1930. Serial No. 466,062.

This invention relates generally to weighing scales in which the weighing mechanism is enclosed in a casing which affords protection to the vital parts of the scale.

In some establishments, such as dairies, butter packaging houses, and the like, a great deal of humidity prevails in the rooms wherein the scales are located, as water and steam are used frequently to keep the rooms and the scales in sanitary condition. Also in many other establishments the general conditions are such that the vital parts of the weighing mechanism, and particularly the knife edges of the scale, are constantly exposed to the danger of corrosion due to the corrosive action of acids present in the air or in the water on account of the particular activities of such establishments. For instance, in dairies, weighing scales unless effectively protected are readily corroded or injured not only on account of the water and steam used for cleaning purposes but also on account of the action of the lactic acid always present in such establishments. There are many other manufacturing places wherein the vital parts of the scale have to be properly protected against the action of water and other more injurious substances used or incidentally brought into existence by the every day activities of the places.

Attempts have been heretofore made to protect the scales by immersing and operating the entire weighing mechanism in oil, or by providing a casing for enclosing such weighing mechanism and sealing it air-tight by suitable means so as to prevent access to the interior thereof. However, such constructions are not entirely satisfactory. In the case of the scale in which the weighing mechanism is completely immersed in oil care has to be exercised to keep the oil to the proper level and there is always danger of spilling the oil in moving the scale and in cold temperature the viscosity of the oil is considerably increased, thereby impairing the normal action of the scale. In the case of scales wherein the casing is sealed, condensation and consequent corrosion of the vital parts takes place in the interior in cold temperatures, this condensation being due to the all metal construction of the scale and the lack of air circulating through the casing.

It is the purpose of the present invention to provide a weighing scale having an oil chamber from which lead a plurality of outlet connections, the outer ends of which terminate adjacent to the vital parts of the weighing mechanism whereby oil can be discharged from said chamber through said outlet connections on to these vital parts so that the latter are coated with a film of oil which protects said parts against corrosion, thereby preserving indefinitely the accuracy and life of the scale.

Other objects of the invention are to provide an oil reservoir and a pressure pump connected thereto and having a plurality of outlet connections leading to and terminating in close proximity to the vital parts of a scale mechanism whereby, upon the operation of the pump a suitable quantity of oil is forced through said outlet connections and discharged on to said vital parts so that the latter are bathed in oil and protected from dust and against destructive action of the elements.

Further objects of the invention are to provide a weighing scale having a casing for enclosing the weighing mechanism, said casing being adapted to form an oil reservoir, there being an oil pump having its inlet opening disposed below the level of the oil in said casing and having a plurality of outlet conduits leading to and terminating adjacent to the vital parts of the weighing mechanism, such as the fulcrums of the beam and the knife edge bearings whereby the operation of said pump forces oil from said reservoir or casing through said conduits against said vital parts so that the latter are periodically bathed in oil which keeps said parts lubricated and constantly coated with a film of oil, thereby protecting said parts and insuring long and efficient life of the scale, the surplus oil being collected in the lower end of said casing and adapted to be recirculated.

Still further objects of the invention are to provide a weighing scale having an open top casing for enclosing the weighing mechanism and having a cover detachably closing the upper end of said casing, the entire scale being mounted and carried by said cover, the operating mechanism being extended below said cover and enclosed by said casing while the weight indicating means and the platters are extended above said cover.

Additional objects of the invention are to provide a weighing machine having an oil circulating system whereby oil under pressure is discharged on to the operating parts of the weighing machine so as to keep said parts free of dust and protect them against corrosion, the surplus oil being drained and collected in a suitable reservoir to be again recirculated.

With these and other objects in view, my invention consists in certain novel features of construction and arrangement of parts, hereinafter more fully described and claimed, and illustrated in the accompanying drawings, in which—

Figure 1 is a front elevational view of my improved scale with parts thereof broken away to more clearly illustrate my invention.

Figure 2 is a horizontal cross section taken on line 2—2 of Figure 1.

Figure 3 is a vertical transverse cross section taken on line 3—3 of Figure 1.

Figure 4 is a vertical transverse cross section taken on line 4—4 of Figure 1.

Figure 5 is an enlarged cross section taken on line 5—5 of Figure 1.

Referring by numerals to the accompanying drawings, 10 indicates a scale and 11 the support therefor. The support consists of an open top casing 12 and a cover 14. Casing 12 has its upper edge provided with a horizontally disposed marginal flange 15 and cover 14 is detachably secured thereto by fastening means 16 and forms a closure for said casing.

The scale 10, which may be of any type and is, in the present instance, of the even balance type, is carried in its entirety by the cover 14. Thus by detaching the cover from the casing the entire scale can be removed from the latter and the operating mechanism of the scale which is usually enclosed by the casing is exposed and can be inspected or assembled or disassembled.

The scale comprises a main beam 17 which is fulcrumed at 18 by means of knife edge pivots 19 which extend laterally from the beam and have bearings in V-shaped grooves formed in blocks 20. The latter are supported by a U-shaped casting 21 which is disposed transversely of the beam and is secured at its ends to the underside of the cover, as indicated at 22.

Each end of the main beam 17 has pivotally mounted thereon, as at 23, a hanger 24. This pivotal connection 23 consists of an upwardly presented knife-edge pivot 23$^a$ projecting laterally from each side of the beam and engaging an inverted V-shaped groove formed in a bearing block 23$^b$, the latter being fixed to each end of hanger 24.

Extending vertically through and secured to the bite portion 24$^a$ of each hanger 24 is a rod or support 25. The upper portion of this support extends upwardly through an opening 26 formed in cover 14 and the upper end has mounted thereon either a load-receiving platter 27 or a load-offsetting platter 28. A pot 29 is also carried by the upper end of each support 25 below the respective platter and is adapted to receive shot for balancing or sealing out the scale.

The top surface of cover 14 is sloped to each side, as indicated at 30 in Figure 4, thereby providing a suitable water-shed and the edges of the cover are beaded at 31. The beaded edges of the cover extend beyond the flanges 15 and the underside of the cover between the beaded portion 31 and the flanges 15 are undercut as indicated at 32 to prevent water from creeping from the beaded portion to the joint formed by flanges 15 and cover 14. Each opening 26 is provided with an upwardly extending sleeve 33, and each pot 29 is provided with a downwardly opening recess 29$^a$ into which the upper end of sleeve 33 extends. This arrangement prevents the water from entering the interior of the casing without requiring any means for sealing the stems or supports 25.

The lower end of each stem or support 25 extends below hanger 24 and has pivotal connection with one end of a check link 34, as indicated at 35. The link 34 is fulcrumed at 36 to a pin 37 which is dependent from the bite portion of casting 21.

The indicating mechanism is enclosed in a housing 38 which is secured to and extends upwardly from cover 14. This housing has its front wall provided with a window 38$^a$ through which is visible a chart 39 which is stationarily mounted therein and is provided with suitable weight indicia. A pointer 40 is fixed to a torsion element 41 and extends upwardly into said housing and is movable in accordance with the movement of the beam and relatively to the weight indicia of chart 39. The torsion element 41 is arranged to one side of beam 17 and is held in position by a casting 42 which is fixed to cover 14 as indicated at 42$^a$. A lateral extension 43 is fixed to one side of beam 17 and pivotally connected to the outer end of said extension is a link 44, the upper end of which is connected to the outer end of arm 45 which extends radially from torsion element 40. Thus as beam 17 is actuated on fulcrums 18 the pointer 39 is operated accordingly. A dashpot 46 is supported from casting 21 by means of a bracket 47. A piston 48 operates in said dashpot and is carried by the lower end of a piston rod 49, the upper end of which is pivotally connected to beam 17 as indicated at 50. The upper end of the pot is open and the access to the lower end thereof is controlled by a valve 51 which is adjustable by a manually operable member 52 to regulate the admission of oil to the lower end of said pot. The dashpot forms the driving mechanism for the scale in the usual manner.

In order to protect the operating or vital parts of the scale, such as fulcrum 18, pivots 23, and the pivotal connections of link 44, an oil circulating system is provided by means of which oil can be periodically discharged by pressure on to said parts and other vital parts of the mechanism, thereby keeping them constantly covered with a film of oil which protects said parts against corrosion, removes the dust, and keeps the parts lubricated. Thus this film of oil protects the vital parts of the weighing mechanism against moisture and acid and reduces wear on the operating parts, thereby insuring efficient and long life of the scale.

As disclosed herein this system comprises a pump cylinder 54 which is attached at its upper end to a boss 55 formed on the underside of cover 14. This cylinder extends downwardly and has its lower end closed as indicated at 54ª. A piston rod 56 operates through boss 55 and extends into pump 54 and fixed to the lower end of said piston rod is a piston 57. The upper end of rod 56 projects outwardly through a packing gland 58 and is provided with a suitable knob or handle 59 by means of which said piston can be manually operated.

The lower end of cylinder 54 terminates a suitable distance below the level of oil contained in the casing, which level is indicated by the line $x-x$. The cylinder is provided near said oil level with a series of apertures 60 and with a longitudinally disposed slot 61, which latter extends upwardly a suitable distance above said oil level.

Leading from the lower end of cylinder 54 is a plurality of conduits or tubes 62 which extend outwardly and upwardly from said pump and have their outer ends terminating in discharge nozzles 63. Each of these nozzles is disposed adjacent to one of the operating or vital parts of the weighing mechanism, such as fulcrums 18, pivots and pivotal connections of link 44. A filler 64 is arranged in one of the walls of casing 14 and provides means for introducing oil into said casing. The upper end of this filler is substantially in horizontal plane with the indicated oil level $x-x$ and is closed by a plug 65.

In using the oil pressure system, the handle 59 is operated to raise piston 57. Upon the upward movement of this piston, such oil contained in the cylinder 54 and displaced by said piston is discharged from the cylinder chamber through vertically disposed slot 61. When the piston 57 passes apertures 60 and the lower end of slot 61, oil rushes into the lower end of the pump from the casing 12 and fills the lower end of said cylinder. Upon the downward movement of piston 57 and after the latter has passed apertures 60 and the lower end of slot 61, the oil is forced under pressure into conduits 62 and is discharged through the respective nozzles 63 on to the parts of the scale mechanism located adjacent to such nozzles. In this manner the parts are kept covered by a film of oil which protects the surfaces against the corrosive action of the moisture and acids, and at the same time said parts are adequately lubricated thereby reducing friction. Also any dust or foreign particles which may have found their way into said parts are floated away by the surplus oil. This surplus oil is collected in the lower part of the casing 12 and is recirculated by the pump. As the intake opening of the pump is located a substantial distance above the bottom of the casing, dust or other foreign substances are allowed to settle in said casing and are prevented from being recirculated with the oil.

In the present instance no conduits have been provided for the check link 34 as the pivotal connection between the check link and the supports will receive adequate supply of oil due to the surplus oil supplied to pivots 23 while the fulcrum 36 of the check link receives the surplus oil supplied to fulcrum 18. However, if desired, separate conduits 62 could be arranged for these parts.

It will be noted that the operating mechanism of the scale is disposed above the level of the oil and is not immersed therein, and, therefore, the freedom of the scale parts in seeking equilibrium is not impeded by the oil and is not effected by the changes in viscosity of the oil so that the speed and sensitiveness of the scale is not reduced in low temperatures.

The compartment containing the operating parts is not air-tight and is maintained at all times at atmospheric pressure. This feature is an obvious advantage as in scales where the weighing mechanism is contained in an air-tight compartment or casing, temperature changes will cause a differential air pressure with respect to the atmospheric pressure, thereby causing the air in the casing to condense. This condensation or swetting process is a contributing cause to the corrosion of the vital parts of the weighing mechanism and therefore facilitates the inaccurate operation of the scale and shortens the life thereof.

In my improved scale the operation of the pump serves to cover the vital parts of the weighing mechanism with a film of oil, thereby offering protection against corrosion without being accompanied by the aforesaid objections.

As it is not desired to have the weighing mechanism immersed or in direct contact with the oil in the casing, the filler 64 is provided to control the level of the oil in the casing, the upper end of the filler representing the proper oil level.

The entire weighing mechanism, including the oil circulating system, is mounted on cover 14 so that by detaching said cover from casing 12 the mechanism contained within the casing is removed from the latter without the necessity of disturbing or disconnecting any of the mechanisms supported by the cover.

I claim:

1. A weighing scale comprising in combination a weighing mechanism, an oil reservoir, and conduits for conveying oil from said reservoir to certain operating parts of said mechanism.

2. A weighing scale comprising in combination with the mechanism thereof, of an oil reservoir, a pump communicating therewith, and a plurality of conduits leading from said pump and terminating adjacent to certain parts of said mechanism whereby the operation of said pump forces oil through said conduits on to said parts.

3. In a weighing scale, the combination with the weighing mechanism, of an oil reservoir, and means for conveying oil from said reservoir to various parts of said weighing mechanism.

4. In a weighing scale, the combination with the weighing mechanism, of an oil reservoir, and means including a pump for conveying oil under pressure from said reservoir to certain parts of said weighing mechanism.

5. In a weighing scale, the combination with the weighing mechanism thereof, of an oil reservoir, an oil distributor having an intake in said reservoir, and a plurality of oil conduits leading from said distributor and having their discharge ends arranged adjacent to the vital parts of said weighing mechanism for maintaining said parts covered by a film of oil discharged from said distributor.

6. In a weighing scale, the combination with the weighing mechanism therefor, of an oil reservoir disposed below said mechanism, a pump having its intake disposed in said oil reservoir, and a plurality of oil conduits leading from said pump and having discharge ends arranged adjacent to the vital parts of said weighing mechanism whereby the operation of the pump draws the oil from said reservoir and forces it through said conduits on to said vital parts.

7. In a weighing scale, the combination with the weighing mechanism thereof, of a casing enclosing said mechanism and forming oil reservoir, a pump disposed within said casing and provided with an intake disposed below the level of the oil contained in said casing, and a plurality of conduits leading from the outlet end of said pump and having their discharge ends arranged near the upper parts of said weighing mechanism whereby oil can be forced under pressure by said pump and through said conduits on to the vital parts of said weighing mechanism, the surplus oil being drained back into said casing.

8. In a weighing scale, the combination with the weighing mechanism thereof, of a support for said weighing mechanism, a casing detachably secured to said support and enclosing said mechanism, said casing forming an oil reservoir, the level of which is disposed below said weighing mechanism, a pump secured to said support and extending downwardly therefrom, said pump being provided with oil intake openings disposed below the level of the oil, a plurality of conduits leading from the outlet end of said pump and having their discharge ends arranged adjacent to the vital parts of said weighing mechanism, and a manually operable member for actuating said pump whereby oil is forced from said casing through said conduits on to said vital parts so that the latter are covered with a film of oil and protected thereby against corrosion, the surplus oil drained from said vital parts being returned to said casing.

9. In a weighing scale, the combination with the weighing mechanism thereof, of an open top casing adapted to enclose said mechanism, a cover detachably closing said casing, said casing being adapted to contain oil, the level of which is arranged below said weighing mechanism, a pump attached to said cover and dependent therefrom, the oil intake opening of said pump being arranged below the oil level, a piston operating in said pump, oil conduits leading from the outlet end of said pump and having their discharge ends disposed near the vital parts of said weighing mechanism, and manually operable means connected to said piston and extending outwardly through said cover for causing the oil contained in the casing to be discharged under pressure through said conduits on to the parts of said weighing mechanism, the surplus oil being drained from said parts into the lower end of said casing.

10. In a weighing scale, the combination with the weighing mechanism thereof, of a casing adapted to enclose said mechanism and forming a reservoir for oil, the level of which is disposed below said mechanism, a pump having its intake disposed in said oil, a plurality of outlet conduits leading from said pump and having their discharge ends arranged adjacent to the vital parts of said mechanism whereby the oil discharged from said conduit is caused to bathe said vital parts and keep them covered with a film of oil and properly lubricated, the surplus oil being drained into said casing carrying away with it dust and other foreign substances, and means for actuating said pump.

11. In a weighing scale, the combination of a scale mechanism, a pump, an oil reservoir disposed below said mechanism and containing a suitable quantity of oil, the intake of said pump being disposed in said oil, and a plurality of oil outlets leading from said pump and having discharge ends disposed adjacent to the vital parts of said scale mechanism whereby said parts at each actuation of said pump are bathed in oil which protects said parts against corrosion and maintains them free of dust and properly lubricated.

12. In a weighing scale, the combination of a scale mechanism, a pump including a piston operatively disposed therein, an oil reservoir disposed below said scale mechanism and containing a quantity of oil, the intake of said pump being disposed within said oil, a plurality of oil outlets leading from said pump and having their discharge ends disposed in close proximity to the vital parts of said mechanism whereby oil is forced under pressure on to said parts, and a manually operable means associated with said piston for actuating the latter.

13. In a weighing scale, the combination of an oil reservoir, a pump having its intake disposed in the oil contained in said reservoir, and a plurality of outlet conduits leading from said pump and adapted to have the discharge ends disposed in close proximity to the scale parts which it is desired to protect whereby a quantity of oil can be periodically ejected by means of said pump on to said parts, the surplus oil being collected in said reservoir and recirculated.

14. In a weighing scale, the combination with an oil reservoir, of an oil distributor, and a plurality of conduits leading from said distributor and having their discharge ends adapted to be disposed adjacent to vital parts of a scale mechanism whereby oil can be discharged from said distributor on to such parts.

15. In a device of the class described, the combination with a weighing mechanism, of an oil distributor adapted to receive oil, and a plurality of discharge conduits leading from said distributor and having their ends adapted to be arranged adjacent to vital parts of said weighing mechanism whereby oil can be discharged regularly from said distributor through said conduits on to said vital parts to protect them against corrosion and maintain them properly lubricated.

16. In a weighing scale, a pump adapted to be supplied with oil, and a plurality of conduits leading from said pump and having their discharge ends adapted to be disposed adjacent to the vital parts of a scale mechanism whereby oil under pressure can be discharged by said pump on to said parts to keep the latter covered with a protective film of oil.

17. In a device of the class described, the combination with a casing containing oil and a weighing mechanism housed in said casing, of a pump in said casing and having its intake disposed within said oil, a series of outlet conduits leading from said pump and having their discharge ends terminating in close proximity to selected parts of said weighing mechanism, and a piston associated with said pump, which, when operated, causes a simultaneous discharge of oil from each outlet conduit on to the respective part of said weighing mechanism.

18. In a weighing scale, the combination of an oil reservoir, a pressure pump having its intake disposed in the oil of said reservoir, a plurality of outlet conduits leading from said pump and terminating adjacent to the vital parts of a scale, a piston disposed in said pump and operable exteriorly of said oil reservoir to cause simultaneous discharge of oil through said conduits on to the vital parts of said scale.

19. In a weighing scale, the combination of a weighing mechanism, a casing for housing said mechanism and adapted to contain lubricating liquid, and operative means within said casing for simultaneously discharging a quantity of liquid onto a plurality of selected parts of said scale mechanism.

20. In a weighing scale, the combination with a weighing mechanism, of a casing for enclosing the same and adapted to contain oil in the lowermost portion; and oil pressure means, including an intake within said oil and outlets arranged adjacent to vital parts of said scale, for discharging said oil simultaneously onto said selected parts of said scale mechanism.

In testimony whereof I hereunto affix my signature this 13th day of May, 1930.

HARRY C. SCHAPER.